(12) United States Patent
Park

(10) Patent No.: US 8,972,543 B1
(45) Date of Patent: Mar. 3, 2015

(54) MANAGING CLIENTS UTILIZING REVERSE TRANSACTIONS

(75) Inventor: Soo Hwan Park, San Jose, CA (US)

(73) Assignee: Spirent Communications, Inc., Sunnyvale, CA (US)

(*) Notice: Subject to any disclaimer, the term of this patent is extended or adjusted under 35 U.S.C. 154(b) by 0 days.

(21) Appl. No.: 13/444,299

(22) Filed: Apr. 11, 2012

(51) Int. Cl.
*G06F 15/16* (2006.01)

(52) U.S. Cl.
USPC .......................................... 709/221; 709/206

(58) Field of Classification Search
USPC ................................................. 709/206, 221
See application file for complete search history.

(56) References Cited

U.S. PATENT DOCUMENTS

| | | | |
|---|---|---|---|
| 5,067,104 A | 11/1991 | Krishnakumar et al. |
| 5,185,860 A | 2/1993 | Wu |
| 5,459,837 A | 10/1995 | Caccavale |
| 5,485,409 A | 1/1996 | Gupta et al. |
| 5,892,903 A | 4/1999 | Klaus |
| 6,088,804 A | 7/2000 | Hill et al. |
| 6,324,656 B1 | 11/2001 | Gleichauf et al. |
| 6,363,477 B1 | 3/2002 | Fletcher et al. |
| 6,574,737 B1 | 6/2003 | Kingsford et al. |
| 6,584,569 B2 | 6/2003 | Reshef et al. |
| 6,609,205 B1 | 8/2003 | Bernhard et al. |
| 6,654,914 B1 | 11/2003 | Kaffine et al. |
| 6,697,751 B2 | 2/2004 | Skingsley et al. |
| 6,952,779 B1 | 10/2005 | Cohen et al. |
| 7,152,105 B2 | 12/2006 | McClure et al. |
| 7,159,151 B2 | 1/2007 | Morgan et al. |
| 7,178,166 B1 | 2/2007 | Taylor et al. |
| 7,181,769 B1 | 2/2007 | Keanini et al. |
| 7,185,232 B1 | 2/2007 | Leavy et al. |
| 7,243,148 B2 | 7/2007 | Keir et al. |
| 7,257,630 B2 | 8/2007 | Cole et al. |
| 7,272,650 B2 | 9/2007 | Elgebaly et al. |
| 7,278,061 B2 | 10/2007 | Smith |
| 7,290,145 B2 | 10/2007 | Falkenthros |
| 7,315,801 B1 | 1/2008 | Dowd et al. |
| 7,342,892 B2 | 3/2008 | Soon et al. |
| 7,346,922 B2 | 3/2008 | Miliefsky |

(Continued)

FOREIGN PATENT DOCUMENTS

WO 2006/099536 9/2006

OTHER PUBLICATIONS

U.S. Appl. No. 11/696,605, filed Apr. 4, 2007.

(Continued)

*Primary Examiner* — Ebrahim Golabbakhsh
(74) *Attorney, Agent, or Firm* — Haynes Beffel & Wolfeld LLP; Ernest J. Beffel, Jr.

(57) ABSTRACT

Various embodiments are directed to systems and methods for managing a plurality of clients. A controller may be programmed to receive a first request message from a first client. The request message may be formatted as a request according to a transport layer protocol and may comprise information describing the first client. The controller may also select a command to be executed by the first client and send a response message to the first client, where the response message is formatted according to the transport layer protocol as a response. The response message may comprise information describing the command to be executed by the first client. The controller may additionally receive a second request message from the first client. The second request message may comprise information describing a result of the command indicated by the response message.

29 Claims, 8 Drawing Sheets

(56) References Cited

U.S. PATENT DOCUMENTS

| | | |
|---|---|---|
| 7,421,621 B1 | 9/2008 | Zambrana |
| 7,447,966 B2 | 11/2008 | Kamannavar et al. |
| 7,451,488 B2 | 11/2008 | Cooper et al. |
| 7,471,999 B2 | 12/2008 | Taki |
| 7,509,675 B2 | 3/2009 | Aaron |
| 7,512,125 B2 | 3/2009 | Betts et al. |
| 7,536,456 B2 | 5/2009 | Williams et al. |
| 7,536,605 B2 | 5/2009 | Keaffaber et al. |
| 7,543,056 B2 | 6/2009 | McClure et al. |
| 7,562,147 B1* | 7/2009 | Cohen ..................... 709/228 |
| 7,594,142 B1 | 9/2009 | O'Leary et al. |
| 7,607,170 B2 | 10/2009 | Chesla |
| 7,624,422 B2 | 11/2009 | Williams et al. |
| 7,627,669 B2 | 12/2009 | Dugatkin et al. |
| 7,627,891 B2 | 12/2009 | Williams et al. |
| 7,627,900 B1 | 12/2009 | Noel et al. |
| 7,664,845 B2 | 2/2010 | Kurtz et al. |
| 7,673,043 B2 | 3/2010 | Keir et al. |
| 7,774,637 B1 | 8/2010 | Beddoe et al. |
| 7,954,161 B1 | 5/2011 | Guruswamy et al. |
| 7,958,230 B2 | 6/2011 | Guruswamy et al. |
| 7,958,560 B1 | 6/2011 | Guruswamy |
| 8,099,456 B2* | 1/2012 | Harjanto ................. 709/203 |
| 8,127,038 B2* | 2/2012 | Lary et al. .............. 709/231 |
| 8,464,219 B1* | 6/2013 | Wilkerson .............. 717/120 |
| 2001/0034847 A1 | 10/2001 | Gaul, Jr. |
| 2002/0022952 A1 | 2/2002 | Zager |
| 2002/0157041 A1 | 10/2002 | Bennett et al. |
| 2003/0009696 A1 | 1/2003 | Bunker V. et al. |
| 2003/0051163 A1 | 3/2003 | Bidaud |
| 2003/0120700 A1* | 6/2003 | Boudnik et al. .......... 709/102 |
| 2003/0154399 A1 | 8/2003 | Zuk et al. |
| 2003/0159063 A1 | 8/2003 | Apfelbaum et al. |
| 2004/0001443 A1 | 1/2004 | Soon et al. |
| 2004/0068586 A1 | 4/2004 | Xie et al. |
| 2004/0068675 A1 | 4/2004 | Liu |
| 2004/0103315 A1 | 5/2004 | Cooper et al. |
| 2004/0205557 A1 | 10/2004 | Bahrs et al. |
| 2004/0230881 A1 | 11/2004 | Gwak |
| 2005/0015213 A1 | 1/2005 | Somervill et al. |
| 2005/0044418 A1 | 2/2005 | Miliefsky |
| 2005/0135391 A1 | 6/2005 | Sung |
| 2005/0144137 A1 | 6/2005 | Kumar et al. |
| 2005/0195820 A1 | 9/2005 | Betts et al. |
| 2005/0248457 A1 | 11/2005 | Himberger et al. |
| 2005/0273772 A1 | 12/2005 | Matsakis et al. |
| 2005/0273854 A1 | 12/2005 | Chess et al. |
| 2005/0273859 A1 | 12/2005 | Chess et al. |
| 2006/0005231 A1 | 1/2006 | Zuk et al. |
| 2006/0015941 A1 | 1/2006 | McKenna |
| 2006/0015943 A1 | 1/2006 | Mahieu |
| 2006/0021034 A1 | 1/2006 | Cook |
| 2006/0021044 A1 | 1/2006 | Cook |
| 2006/0021045 A1 | 1/2006 | Cook |
| 2006/0021046 A1 | 1/2006 | Cook |
| 2006/0021047 A1 | 1/2006 | Cook |
| 2006/0021048 A1 | 1/2006 | Cook et al. |
| 2006/0021049 A1 | 1/2006 | Cook |
| 2006/0036755 A1 | 2/2006 | Abdullah et al. |
| 2006/0080733 A1 | 4/2006 | Khosmood et al. |
| 2006/0085723 A1 | 4/2006 | Bartz et al. |
| 2006/0098579 A1 | 5/2006 | Chang et al. |
| 2006/0106939 A1 | 5/2006 | Cha et al. |
| 2006/0137009 A1 | 6/2006 | Chesla |
| 2006/0277606 A1 | 12/2006 | Yunus et al. |
| 2007/0006037 A1 | 1/2007 | Sargusingh et al. |
| 2007/0011319 A1 | 1/2007 | McClure et al. |
| 2007/0086389 A1 | 4/2007 | Park et al. |
| 2007/0094728 A1 | 4/2007 | Julisch et al. |
| 2007/0115962 A1 | 5/2007 | Mammoliti et al. |
| 2007/0124363 A1* | 5/2007 | Lurie et al. .............. 709/202 |
| 2007/0174917 A1 | 7/2007 | Guruswamy |
| 2007/0204347 A1 | 8/2007 | Caceres et al. |
| 2008/0005555 A1 | 1/2008 | Lotem et al. |
| 2008/0072322 A1 | 3/2008 | Guruswamy |
| 2008/0092237 A1 | 4/2008 | Yoon et al. |
| 2008/0098479 A1 | 4/2008 | O'Rourke et al. |
| 2008/0120283 A1 | 5/2008 | Liu et al. |
| 2008/0155338 A1 | 6/2008 | Rusmanov |
| 2008/0282352 A1 | 11/2008 | Beddoe et al. |
| 2009/0083854 A1 | 3/2009 | Bozanich et al. |
| 2009/0161565 A1 | 6/2009 | Reniere |
| 2009/0172148 A1 | 7/2009 | Underwood |
| 2009/0271863 A1 | 10/2009 | Govindavajhala et al. |
| 2009/0320137 A1 | 12/2009 | White et al. |
| 2009/0328190 A1 | 12/2009 | Liu et al. |
| 2010/0106742 A1 | 4/2010 | Guruswamy et al. |
| 2010/0284282 A1 | 11/2010 | Golic |
| 2010/0284283 A1 | 11/2010 | Golic et al. |
| 2010/0293415 A1 | 11/2010 | Beddoe et al. |
| 2011/0289192 A1* | 11/2011 | Denise et al. ............... 709/219 |
| 2012/0026539 A1* | 2/2012 | Ohara ..................... 358/1.15 |
| 2012/0159601 A1* | 6/2012 | Dalzell et al. ............. 726/9 |
| 2012/0324225 A1* | 12/2012 | Chambers et al. ........... 713/169 |

OTHER PUBLICATIONS

U.S. Appl. No. 13/153,797, filed Jun. 6, 2011.
U.S. Appl. No. 11/154,636, filed Jul. 7, 2011.
Russell, et al., "The Bayeux Specification," 2007, downloaded from http://svn.cometd.com/trunk/bayeux/bayeux.html on Apr. 10, 2012.
"Session Initiation Protocol (SIP)," downloaded from http://searchunifiedcommunications.techtarget.com/definition/Session-Initiation-Protocol on Apr. 10, 2012.
"File Transfer Protocol," downloaded from http://en.wikipedia.org/wiki/List_of_FTP_commands on Apr. 10, 2012.
"List of FTP server return codes," downloaded from http://en.wikipedia.org/wiki/List_of_FTP_server_return_codes on Apr. 10, 2012.
"MGCP, Multimedia Gateway Control Protocol," downloaded from http://www.networksorcery.com/enp/protocol/mgcp.htm on Apr. 10, 2012.
U.S. Appl. No. 11/859,691 for "System and Method to Develop a Multi-Component Software Package From a Model", filed Sep. 21, 2007.
U.S. Appl. No. 12/982,381 for "Hybrid Network Software Provision", filed Dec. 30, 2010.
U.S. Appl. No. 13/095,807 for "Scalable Control System for Test Execution and Monitoring Utilizing Multiple Processors", filed Apr. 27, 2011.
U.S. Appl. No. 13/101,728 for "Generating Communication Protocol Test Cases Based on Network Traffic", filed May 5, 2011.
U.S. Appl. No. 13/118,155 for "Scenario Based Scale Testing", filed May 27, 2011.
U.S. Appl. No. 13/279,983 for "Pass-Through Testing Using Message Exchange Identifiers", filed Oct. 24, 2011.
U.S. Appl. No. 13/345,323 for "Analyzing the Security of Communication Protocols and Channels for a Pass Through Device", filed Jan. 6, 2012.
U.S. Appl. No. 13/345,332 for "Platform for Analyzing the Security of Communication Protocols and Channels", filed Jan. 6, 2012.
U.S. Appl. No. 13/413,353 for "Generating Test Scenarios From Application-Layer Messages", filed Mar. 6, 2012.
"Cisco Discovery Protocol" posted at: http://netcert.tripod.com/ccna/switches/cdp.html on May 23, 2007.
Wagner, D. et al., "Intrusion Detection Via Static Analysis", IEEE Symposium on Security and Privacy, 2001, pp. 156-168.
Finlay, I. et al., "Multiple Vulnerabilities in Many Implementations of the Simple Network Management Protocol (SNMP)", CERT® Advisory CA-2002-03, Pittsburgh, PA, US.
Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.
Kaksonen, R., "A Functional Method for Assessing Protocol Implementation Security", VTT Publications 448, 2011, 128 p.+app. 15p., Technical Research Centre of Finland, FI.
Kaksonen, R., "Software Security Assessment through Specification Mutations and Fault Injection", Proceedings of the Int'l Federation for Information Processing (IFIP), TC-6/TC-11 Fifth Joint Int'l

(56) References Cited

OTHER PUBLICATIONS

Working Conference on Communications and Multimedia Security (CMS'01), May 21-22, 2001, Darmstadt, Germany, pp. 173-183.
Miller, B. et al., "Fuzz Revisited: A Re-examination of the Reliabiltiy of Unix Utilities and Services", Computer Sciences Department, Oct. 1995, pp. 1-23, Madison, Wisconsin, US.
PROTOS Test-Suite: c06-snmpv1, University of Oulu (ee.oulu.fi)—http://www.ee.oulu.fi/research/ouspg/protos/testing/c06/snmpv1/index, Oct. 17, 2002, pp. 1-26, Finland.
PROTOS Test-Suite: c06-ldapv3, University of Oulu(ee.oulu.fi)—http://www.ee.oulu.fi/research/ouspg/protos/testing/c06/ldapv3/index.html, Dec. 2001, p. 1-13, Finland.
Beddoe, M., "Network protocol Analysis using Bioinformatics Algorithms", 2004, retrieved on May 17, 2007, from <URL: http://www.4tphi.net/~awalters/PI/pi.pdf>.
Case, J. et al., "A Simple Network Management protocol (SNMP)" (RFC 1157), May 1990, retrieved on May 17, 2007, from <URL: http://www.faqs.org/rfcs/rfc1157.html>.
Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.
McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.
Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.
Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.
Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM.pdf>.
Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.
Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.
Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-usa-02-aitel-spike.ppt>.
Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.
Beddoe, M., "The Protocol Informatics Project: Automating Network Protocol Analysis" (presentation slides), 2005.
Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.
Beizer, B., "Chapter 9: Syntax Testing", in Software Testing Techniques, 2nd Ed., 1990, pp. 284-319, Van Nostrand Reinhold, New York, NY.
Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.
Mu Security, "6 Degrees of Protocols", 2006.
Mu Security, "Protocol Vulnerability Patterns", Apr. 2006.
Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.
Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.
Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.
Bellovin, S. "A Technique for Counting NATted Hosts", Proceedings: Second Internet Measurement Workshop (IMW), Marseille, France, Nov. 6-8, 2002, pp. 267-272.
Bradner, S. et al., "Benchmarking Methodology for Network Interconnect Devices (RFC_1944)", May 1996, online, retrieved on May 12, 2006, from <URL: http://rfc.net/rfc1944.html>.
Bradner, S. et al., Benchmarking Methodology for Network Interconnect Devices (RFC_2544), Mar. 1999, online, retrieved on May 12, 2006, from <URL: http://rfc.net/rfc2544.html>.
Cisco Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatrav.pdf>.
Dunn, J. et. al., "Methodology for ATM Benchmarking (RFC 3116)", Jun. 2011, online, retrieved on May 12, 2006, from <URL: http://rfc.net/rfc3116.html>.
Egevang, K., et al., "The IP Network Address Translator (NAT) (RFC 1631)", May 1994, online, retrieved on May 12, 2006, from <URL: http://rfc.net/rfc3116.html>.
Microsoft Corp., "Overview of Network Address Translation (NAT) in Windows XP", Sep. 12, 2005, online, retrieved on May 12, 2006, from <URL: http://www.microsoft.com/technet/prodtechnol/winxppro/deploy/nattrnsw.mspx?pd=true>.
NETCOM Systems, "SmartWindow User Guide Version 6 53", Document No. 340-1020-001 REV C, Dec. 1999, online, retrieved on May 12, 2006, from <URL: https://www.cobra.ee.ntu.edu.tw/~oops/HTML6/08_exp/smartbit%20reading.pdf>.
Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~ljilja/cnl/pdf/milan.pdf>.
Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.
Srisuresh, P. et al., "IP Network Address Translator (NAT) Terminology and Considerations (RFC 2663)", Aug. 1999, online, retrieved on May 12, 2006, from <URL: http://rfc/net/rfc2663.html>.
Srisuresh, P. et al., "Traditional IP Network Address Translator (Traditional NAT) (RFC 3022)", Jan. 2001, online, retrieved on May 12, 2006, from <URL: http://rfc.net/rfc3022.html>.
Trend Communications, "RFC 2544 Testing with Aurora Tango", date unknown, online, retrieved on May 12, 2006, from <URL: http://www.trendtest.co.uk/trendweb/resource.nsf/vlFileURL-Lookup/en%5E%5ERFC+2544+testing/$FILE/GbEnet.2544.test.pdf>.
Udupa, R. et al., "Performance Issues and Evaluation Techniques for Networking Devices", 2001, online, retrieved on May 12, 2006, from URL: http://softwaredioxide.com/Channels/events/testing2001/Presentations/raghavendra_infosys.pdf>.

(56) References Cited

OTHER PUBLICATIONS

PCT International Search Report and Written Opinion, PCT/US06/09512, Aug. 31, 2006.
Wikipedia.com, Active Directory, http://en.wikipedia.org/wiki/Tunneling_protocol.
Wikipedia.com, Active Directory, http://en.wikipedia.org/wiki/Session_initiation.
Gordano.com, What is the SMTP/EHLO clause.
U.S. Appl. No. 11/514,809, filed Sep. 1, 2006.
U.S. Appl. No. 11/859,691, filed Sep. 21, 2007.
U.S. Appl. No. 11/351,402, filed Feb. 10, 2006.

* cited by examiner

MANAGING CLIENTS UTILIZING REVERSE TRANSACTIONS

BACKGROUND

Many distributed processing systems utilize server/client configurations. According to most such configurations, a server or controller issues commands to various clients. The clients execute the commands and typically provide results of the execution to the controller. One application of server/client configurations is in distributed testing and/or monitoring applications, where each client is instructed to perform all or a portion of a testing and/or monitoring task, such as detecting or simulating a malicious attack, simulating a load, etc.

There are various existing communication approaches for implementing client/server communications. According to a message-based approach, the controller sends an instruction message or messages to each client for each action, or portion thereof, that the client is to perform. The clients must provide the controller with a response to each message to validate the success or failure of the request. With most message-based approaches, communications between the controller and the clients are initiated by the controller. Accordingly, the controller must know the identity and location of each client before it can issue an instruction. This increases the complexity of controller implementation and also places practical limitations on the placement of clients. For example, a client placed behind a firewall or network address translation (NAT) device may not be reachable by the controller without considerable overhead complexity and expense.

FIGURES

Various example embodiments of the present invention are described here by way of example in conjunction with the following figures, wherein.

DESCRIPTION

Figure 1:
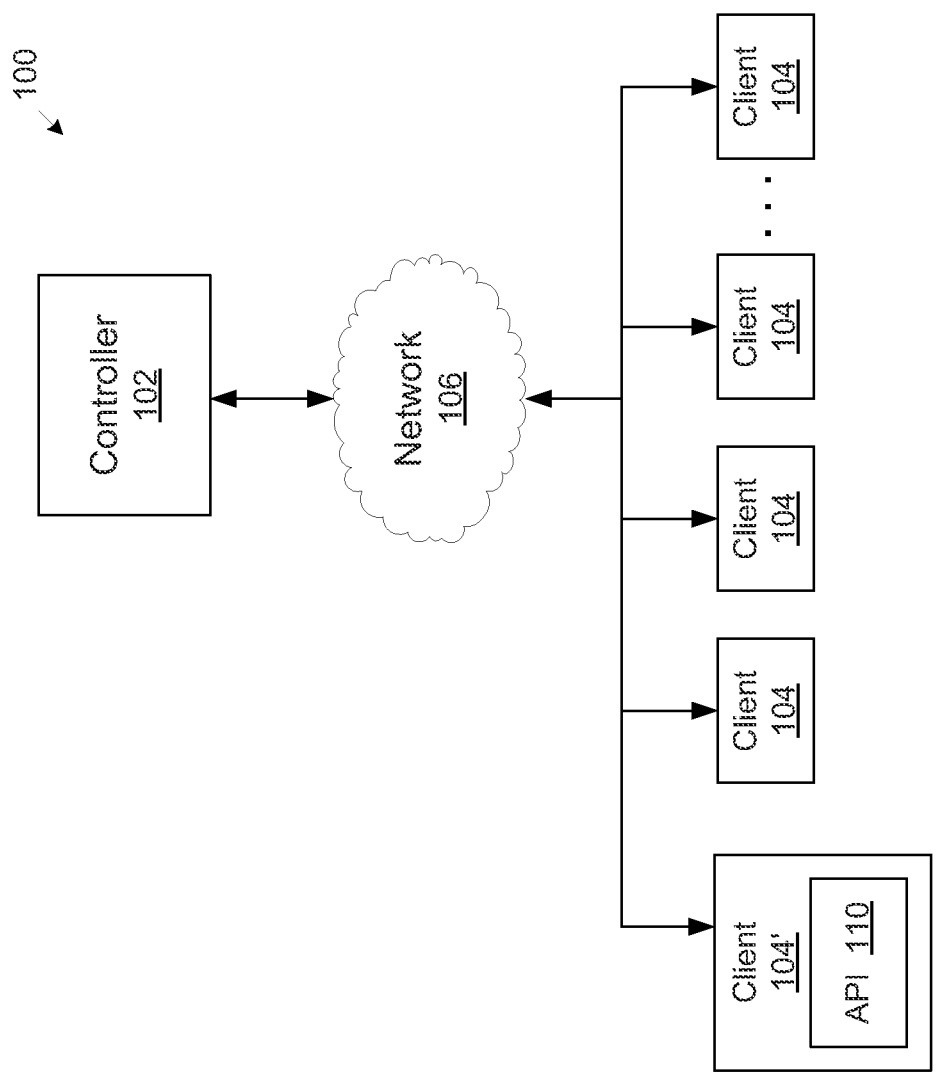
FIG. 1 is a diagram showing one example embodiment of an environment for reverse transaction communications including a controller and various clients.

Various example embodiments are directed to systems and methods for managing communications between a controller and one or more clients utilizing reverse transactions. Messages between the controller and the clients may be formatted according to a transport layer protocol that distinguishes between requests and responses. The controller and clients, however, may utilize the message types in "reverse." For example, commands from the controller to the clients may be included in messages formatted as "responses" according to the transport layer protocol (e.g., response messages). Results of command execution from clients to the server may be included in messages formatted as "requests" according to the transport layer protocol (e.g., request messages).

In various example embodiments, reverse transactions may be initiated by clients. A client may direct a first request message to the controller. The body or payload of the first request message, however, may include data describing the client. Such data may include, for example, an identification of the client, a credential of the client, information describing capabilities of the client, etc. Header information for the first request message may be defined by the transport layer protocol. In various example embodiments, however, the header information includes a network address of the client and/or other connection information, thus allowing the controller to direct messages back to the client. In some example embodiments, the network address and/or other connection information of the client indicated in the header reflects any firewalls and/or network address translation (NAT) devices between the controller and the client, thus making the firewall and NAT devices transparent to the controller.

Upon receiving the first request message, the controller may utilize the data describing the client to authenticate the client and select a command for the client to execute. The command may be included in the body of a response message directed to the client. Because, according to the transport layer protocol, the client is waiting for a "response" from the controller, the connection between the controller and the client may be held open until the response message is received. In some embodiments, if there is no task or command for the client for a threshold amount of time after receipt of the first request message, the controller sends a response message comprising a time-out command. The time-out command instructs the client to maintain its connection to the controller and await an additional response message including an additional command. Once the client receives the response message, including the command, it may execute the command and provide results of the execution to the controller in a subsequent request message. The subsequent request message may also indicate that the connection between client and controller is to be held open until the controller has an additional task for the client.

The use of reverse transactions can provide various advantages in different application settings. For example, the use of reverse transactions may simplify the placement of clients, as it may not be necessary for the controller to have information about the existence and location of each client test engine prior to use. Also, controller overhead may be reduced as it may not be necessary for the controller to connect to the inside of NAT and/or firewall environments to contact clients therein.

According to various example embodiments, reverse transactions are used to manage distributed testing and/or monitoring systems and applications. For example, each client may implement a test engine configured to perform tasks related to testing a device under analysis. Such testing may include scale testing for simulating a load on the device under analysis. For example, each client may be configured to, on command from the controller, simulate a number of connections to the device under analysis. Also, testing may include mutation and/or fuzz testing where messages to the device under analysis are deliberately modified to simulate a malicious attach.

Reference will now be made in detail to several example embodiments, including embodiments showing example implementations of controllers, clients, systems of controllers and clients as well as methods for implementing reverse transaction communications. Wherever practicable similar or like reference numbers may be used in the figures and may indicate similar or like functionality. The figures depict example embodiments of the disclosed systems and methods for purposes of illustration only. One skilled in the art will readily recognize from the following description that alternative example embodiments of the systems and methods illustrated herein may be employed without departing from the principles described herein.

FIG. 1 is a diagram showing one example embodiment of an environment 100 for reverse transaction communications including an example controller 102 and various clients 104. The controller 102 and clients 104 may be in communication with one another via a network 106. The network 106 may be and/or comprise any suitable type of wired and/or wireless network. In some embodiments, the Internet may make up all or a part of the network 106. As described in more detail within, the network 106 may comprise various firewalls and/or NAT devices positioned between the controller 102 and the clients 104. FIG. 1 also shows an example client 104' showing additional details that some clients may have. For example, the client 104' comprises an application program interface (API) 110. The API 110 may serve as an interface for processing commands received from the controller 102, for example, as described herein.

Before providing detailed descriptions of reverse transaction communications between various controllers 102 and clients 104, a brief description of suitable transport layer protocols is provided. Transport layer protocols for reverse transaction communications may include any protocol that distinguishes between requests and responses and allows a message body and/or payload information that can include client and/or command information as described herein. In some example embodiments, the selected transport layer protocol allows for the association of related request and response messages. For example, a device sending a request may expect to receive an associated response. A partial list of example protocols that may be used include, for example, hypertext transfer protocol (HTTP), hypertext transfer protocol secure (HTTPS), Session Initiation Protocol (SIP), file transfer protocol (FTP), media gateway control protocol (MGCP), etc.

Figure 2:
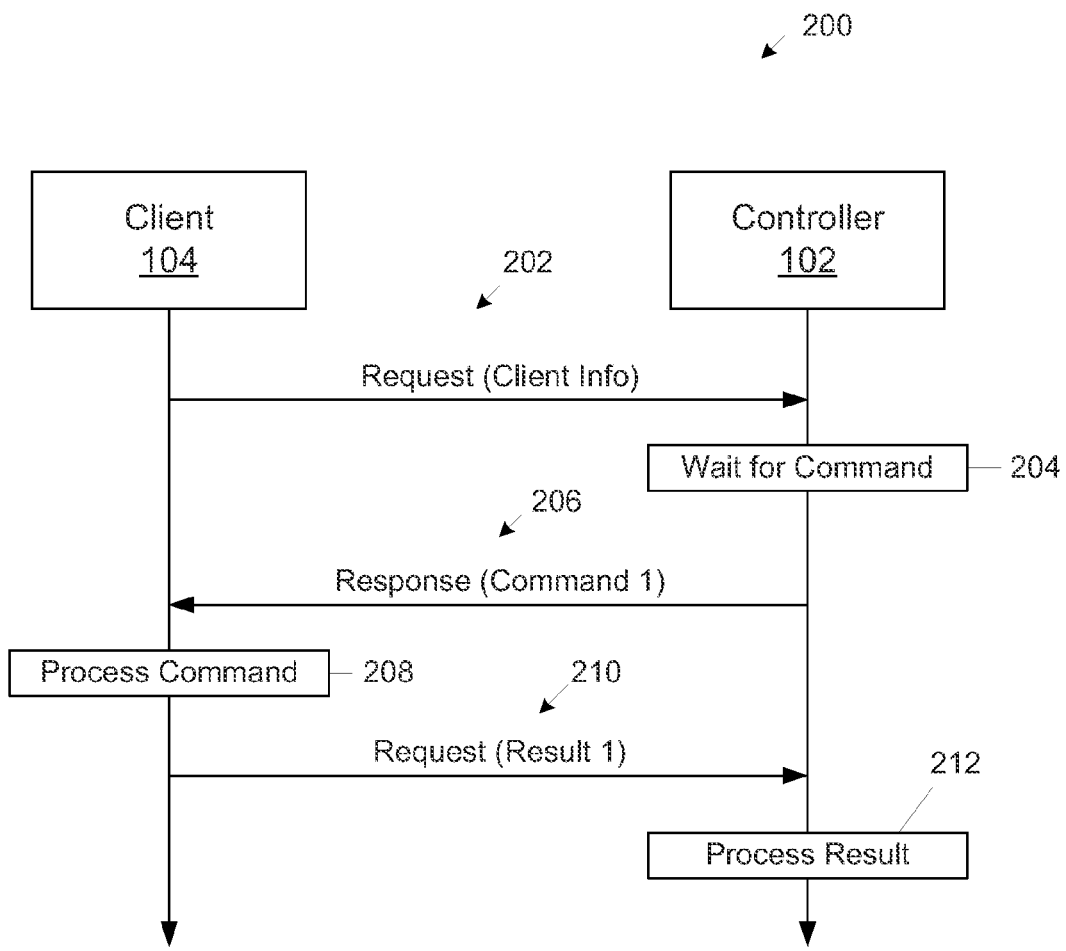
FIG. 2 is a diagram showing one example embodiment of a workflow demonstrating reverse transaction communications between an example client and an example controller.
Figure 3:
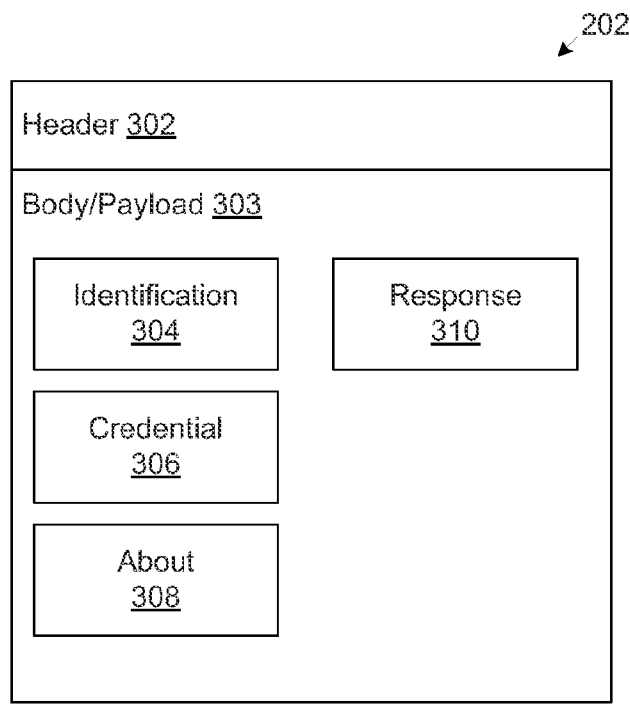
FIG. 3 is a block diagram showing one example embodiment of a request message sent to a controller by a client.

FIG. 2 is a diagram showing one example embodiment of a workflow demonstrating reverse transaction communications between an example client 104 and an example controller 102. The client 104 may send an initial request 202 to the controller 102. In some example embodiments, the request 202 may initiate communication between the controller 102 and the client 104. The request 202 may be formatted as a request according to the transport layer protocol. FIG. 3 is a block diagram showing one example embodiment of a request message 202. The request message 202 comprises a header 302 and a body or payload 303. In various example embodiments, the request message may be a POST request according to the HTTP transport level protocol.

The content of the header 302 may be determined based on the particular transport layer protocol selected. For example, in various example embodiments, the header 302 may comprise routing information for the message 202 including network address and/or connection information identifying the controller 102 and the client 104. It will be appreciated that if the request message 202 traverses a firewall and/or NAT device, it may arrive at the controller 102 with modified network and/or connection information for the client 104. The modified connection information, however, may be utilized by the controller 102 to direct a response message to the client 104, for example, as described herein below. In some example embodiments, the header 302 comprises additional information including, for example, information about the size and/or other properties of the body 303.

The body or payload 303 of the request message 202 may comprise various information describing the client 104. The body 303 itself may be arranged according to any suitable protocol or format. In some example embodiments, the body 303 is arranged according to the JavaScript Object Notation (JSON) format, with or without a schema. For example, when the transport layer protocol is HTTP or HTTPS, the body 303 may be arranged according to JSON. In addition to or instead of JSON, the body 303 may be organized according to various other protocols or formats including, for example, eXtensible Markup Language (XML), YAML Ain't Markup Language (YAML), Binary JSON (BSON), or any other publicly available and/or proprietary protocol, serialization or marshaling method. In various example embodiments, the body 303 comprises various data containers for information describing the client 104. As illustrated in FIG. 3, the body comprises an identification container 304, a credential container 306, an about container 308 and a response container 310. As the body 303 sits on top of the underlying transport layer protocol, transport layer operations such as message chunking and compression may be handled by the underlying transport layer protocol, obviating the need to handle these communication aspects in the body 303.

The identification container 304 may comprise an "id" or unique identifier of the client 104 (e.g., a unique number or other string used to identify the client 104 in a computer device). For example, when the client 104 is executed on a computer device that also executes other clients, the identifier may distinguish the client 104 from other clients executing on the common computer device. The credential container 306 may include a client credential that allows the client to be authenticated to the server. For example, in some example embodiments, the credential container 304 comprises an encrypted credential that may be decrypted by the controller 102 to securely verify the identity of the client 102. Where the client utilizes an API 110, the credential container 304 may comprises an API key that can be utilized by the controller 102 to provide commands to the client 104 via the API 110. Additionally, in some example embodiments, the credential container 304 may comprise instructions for additional handshaking steps that may be performed by the controller 102 and client 104 for each to verify the identity of the other.

The about container 308 comprises information about the capabilities of the client 104. For example, the about container 308 may comprise data describing the types of commands that the client 104 is capable of executing. When the client 104 executes one or more test engines, the about container 308 may describe the test engines and the type of test or tests that the test engines can perform, as described herein below. The optional response container 310 may be reserved for information describing results of a command performed by the client 104. As the request message 202 may initiate reverse transaction communication between the client 104 and controller 102, the response container 310 may be blank.

An example request message 202 is provided below. In the provided example, the transport layer protocol is HTTP and the body is organized according to the JSON protocol:

```
POST/_xxxx HTTP/1.1
Content-Type: application/json
Connection:keep-alive
. .
{
"version":"1.0.0",
"id":1,
"credential":"SOME_CLIENT_KEY",
"about":{ . . . },//capabilities
"response":{ }
}
```

The portion of the example request message 202 prior to the "{ }" is a partial representation of the header 302. The portion within the "{ }" represents the message body 303 and comprises an id container 304, a credential container 306, an about container 308 and an optional response container 310, which is empty in the provided example for the reasons described above. It will be appreciated that various request messages 202 may comprise information and information containers in addition to 304, 306, 308, 310 described above. For example, the example message 202 provided above comprises a version container that may indicate the version of the protocol used to organize the body (e.g., JSON).

Referring now back to FIG. 2, the controller 102 may receive the request message 202 and, at 204, may wait for a command to provide the client 104. According to the transport layer protocol of the message 202, the client 104 may expect a response message associated with the request message. Accordingly, the controller 102 may hold the connection with the client 104 until there is a command to provide to the client 104. The controller 102 may determine a command for the client 104 according to its own process (e.g., based at least in part on the capabilities of the client 104). Also, in some example embodiments in the context of a distributed testing, the controller 102 may provide the client 104 with a command for performing a testing related task (e.g., generating and/or applying a mutation or fuzz test, initiating a connection with a device under analysis for a scale test, etc.).

When the controller 102 determines a command for the client 104, the controller 102 may generate a response message 206 and transmit the same to the client. The response message 206 may be organized according to the transport layer protocol as a response. In various example embodiments, the response message 206 is tied to the request message 202 via the transport layer protocol. For example, header information of the response message 206 may associate it with the request message 202 so that the client 104 may determine that the response message 206 is in reply to the request message 202.

Figure 4:
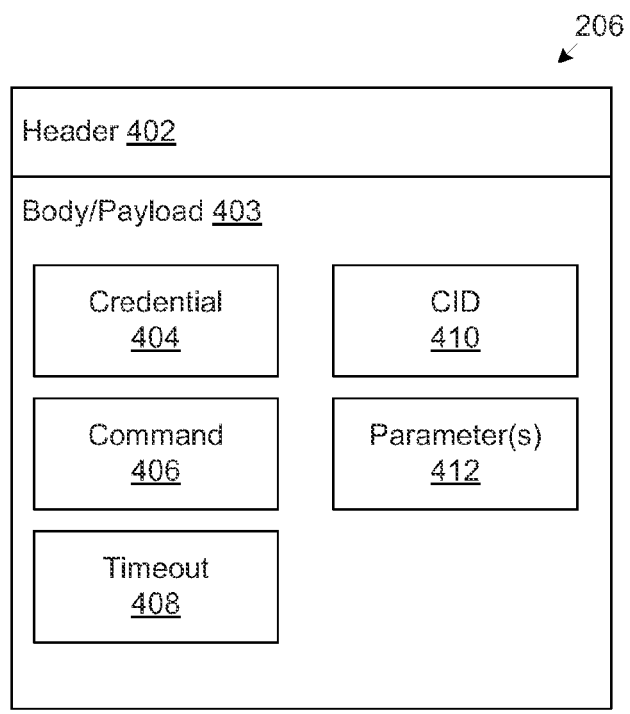
FIG. 4 is a block diagram showing one example embodiment of a response message comprising a command to the client.

Although the response message 206 is configured as a response according to the transport layer protocol, it may include the command to the client 104. Accordingly, the command may "piggyback" on the transport layer protocol response. FIG. 4 is a block diagram showing one example embodiment of the response message 206 comprising a command to the client 104. The message 206 comprises a header 402 and a body/payload 403. Parameters of the header 402 may be determined, for example, by the transport layer protocol utilized. For example, the header 402 may comprise information describing network address and connection information for the controller 102 and the client 104. In some example embodiments, the header 402 also comprises data describing the body 403 such as, for example, a size, etc.

The body or payload 403 comprises various information for delivering the command to the client 104 and may be organized according to any suitable protocol such as, for example, JSON. In the example embodiment shown in FIG. 4, the body 403 comprises a credential container 404, a command container 406, a timeout container 408, a CID container 410, and a parameter container 412. The credential container 404 may comprise information describing a credential of the controller 102. For example, the credential information may be utilized by the client 104 to verify the identity of the controller 102 upon receipt of the response. One type of credential information that may be used includes an encrypted credential that may be decrypted by the client 104 to verify the identity of the controller 102.

The time-out container 408 may comprise a long-poll time out value. The long-poll time out value may indicate to the client 104 how long it should wait for a response message (such as message 206) after sending a request (such as the request message 202, and the request message 210 described below). If the specified time has passed, the client 104 may no longer expect a response message and, for example, may send a new request message 202.

The command container 406 may comprise data describing the command to be executed by the client 104. For example, the command may be a server command against the client and may be processed by the client 104, with the corresponding result returned to the controller 102. The CID container 410 may comprise a unique identifier for the command stored at the command container 406. The parameter container 412 may comprise any arguments to be utilized by the client 104 in executing the command. For example, the parameter container 412 may comprise a start time at which the client 104 is to begin execution of the command. For example, when multiple clients 114 are to perform certain tasks simultaneously, it may be desirable for all of the implicated clients 114 to begin execution at the same time. Also, in some embodiments, the arguments may include a script to be executed by the client 114 to execute all or part of a command and/or a universal resource locator (URL) or other network address indicating the location of such a script. In example embodiments where the client 104 implements an API, the parameter container 412 may comprise all or a portion of an API key providing the controller 102 with access to the client API (e.g., such as client API 110).

An example response message 206 comprising a command is provided below. In the provided example, the transport layer protocol is HTTP and the body is organized according to the JSON protocol:

```
HTTP/1.1 200 OK
Content-Type: application/json
Content-Length: . . . .
{
"credential":"SERVER_CREDENTIAL",
"timeout":30,
"command":"start",
"cid":"start_1248"
"params":{
   "run_id":"test_10238",
   "iteration":false,
   "stats":false
   }
}
```

The portion of the example response messages 206 prior to the outer-most "{ }" is a partial representation of the header 402. The portion within the outer "{ }" represents the message body 403 and comprises a credential container 404, a timeout container 408, a command container 406, a CID container 410, and a parameter container 412. It will be appreciated that various embodiments of the messages 206 may comprise additional containers and additional information other than that in the examples provided herein.

Referring again back to FIG. 2, the client 104 may process the command indicated at the command container 406 at 208 (e.g., according to the parameters of the response message 206). Upon completion of the command, the client 104 may generate and transmit a second request message 210 comprising results of the execution of the command to the controller 102. The second request message 210. As the second request message 210 is a new request message, it may not be associated with the response message 206 including the command, at least according to the transport layer protocol. The controller 102 may match the second request message 210 to its associated response message 206 utilizing the command id, as described herein below.

Figure 5:
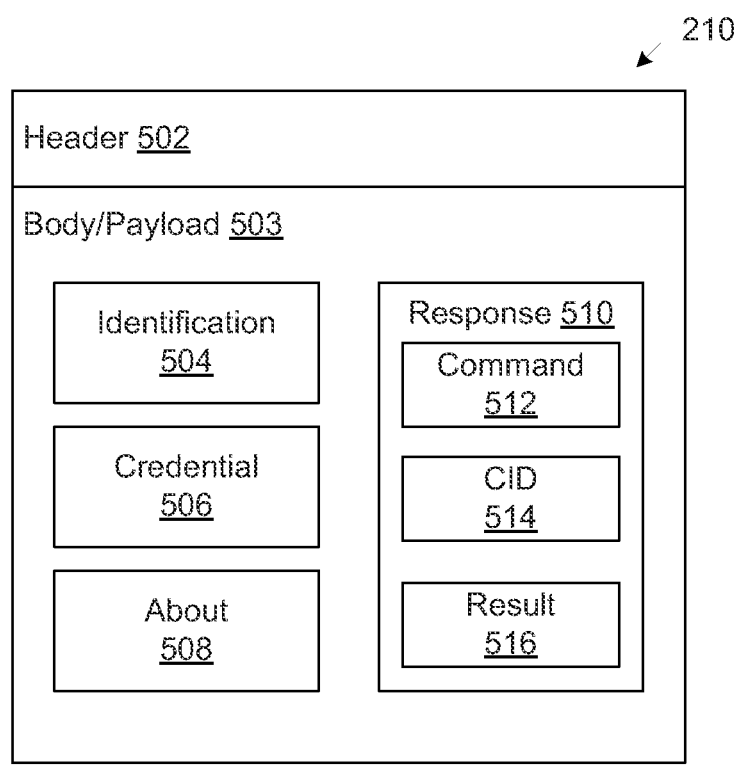
FIG. 5 is a block diagram showing one embodiment of a request message comprising a result of a command provided to the client using a response message.

FIG. 5 is a block diagram showing one embodiment of the request message 210 comprising a result of a command provided to the client using the response message 206. Like the request message 202, the request message 210 may be configured as a request under the utilized transport layer protocol. The request message 210 may comprise a header 502 similar to the header of the message 202 described above. The body 503 of the message 210 may also be similar to the body 303 of the message 202 described above. For example, the body 503 of the message 210 may comprise an identification container 504, a credential container 506, an about container 508, and a response container 510. The response container 510 of the message 210, however, may comprise and/or be associated with additional containers making up a response to the command provided by the response message 206. For example, a command container 512 and a CID container 514 may comprise the command and CID received by the client 104 via the message 206. A result container 510 may comprise results of the execution of the command.

An example request message 210 is provided below. In the provided example, the transport layer protocol is HTTP and the body is organized according to the JSON protocol:
POST/_xxxx HTTP/1.1
Content-Type: application/json
Connection:keep-alive
{
"version":"1.0.0",
"id":1,
"credential":"SOME_CLIENT_KEY",
"about". { . . . },//capabilities
"response":{
   "command":"start",
   "cid":"start_1248",
   "result": {"okay":true, "stats":{ . . . } }
   }
}
Again, the portion of the example request message 210 prior to the "{ }" is a partial representation of the header. The portion within the outer "{ }" represents the message body 503 and comprises an id container 504, a credential container 506, an about container 508 and a response container 510. In contrast to the request message 202, the example of the request message 210 comprises data within the response container 510. For example, the response container 510 comprises the command container 514, the CID container 514 and the result container 510, as described above.

Referring once again back to FIG. 2, the controller 102 may receive the request message 210 and process the results contained therein at 212. As described above, the transport layer protocol may not associate the response message 206 including the command with the prior request message 202 including the response to the command. In various example embodiments, however, the controller 102 may associate the messages 206, 210 based on a common CID included in each.

Also, because of the request/response nature of the underlying transport layer protocol, the client 104 may expect a "response" to the request message 210. Accordingly, the controller 102 may keep the connection with the client 104 open, as described above, until a new command is determined for the client 104. When a new command is ready, the process may repeat itself, with a new response message (similar to the message 206) being generated and transmitted to the client 104 and a new request message (similar to the message 210) being returned in reply.

Figure 6:
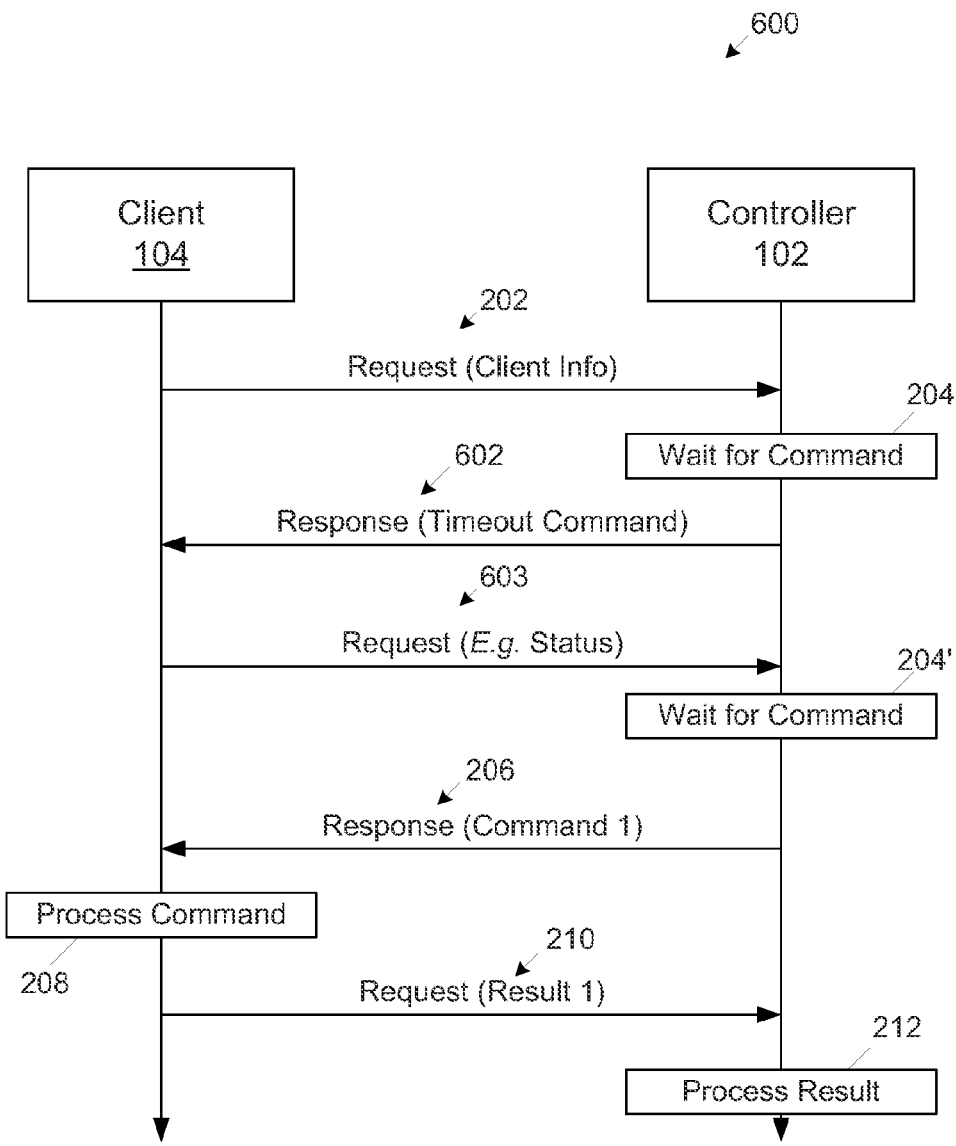
FIG. 6 is a diagram showing one example embodiment of a workflow demonstrating reverse transaction communications between an example client and an example controller where the controller implements a time out command.

FIG. 6 is a diagram showing one example embodiment of a workflow demonstrating reverse transaction communications between an example client and an example controller where the controller implements a time out command. In some example embodiments, as described above, the client 104 may wait a threshold time-out period after sending the initial request message 202 and/or a subsequent request message such as 210. If no response message is received during the time out period (e.g., a response message such as 206 comprising a command), then the client 104 may cease to expect a response. For example, the client 104 may send a new request message, such as 202 and/or hibernate. Accordingly, the controller 102 may be programmed to keep all clients 104 active. For example, if the wait for a command at 204 approaches the client's time out period, the controller 102 may provide the client 104 with a response message 602 comprising a time-out command. The response message 602 may be similar to the response message 206. Upon receipt of the response message 206, the client 104 may send a new request message 603 to the controller 102. The request message 603 may have any suitable payload. In some example embodiments, the payload of the message 603 is a response to the time-out command and may include, for example, a default payload, a status of the client 104, etc. When a new command for the client 104 is found at 204', the response message 206 may be sent, as described above. In various example embodiments, the response message 206, as illustrated in FIG. 6, is a response to the request message 603, according to the transport layer protocol. In this way, the client 104 may continue to expect a response message including a command after its threshold time-out period has run.

Figure 7:
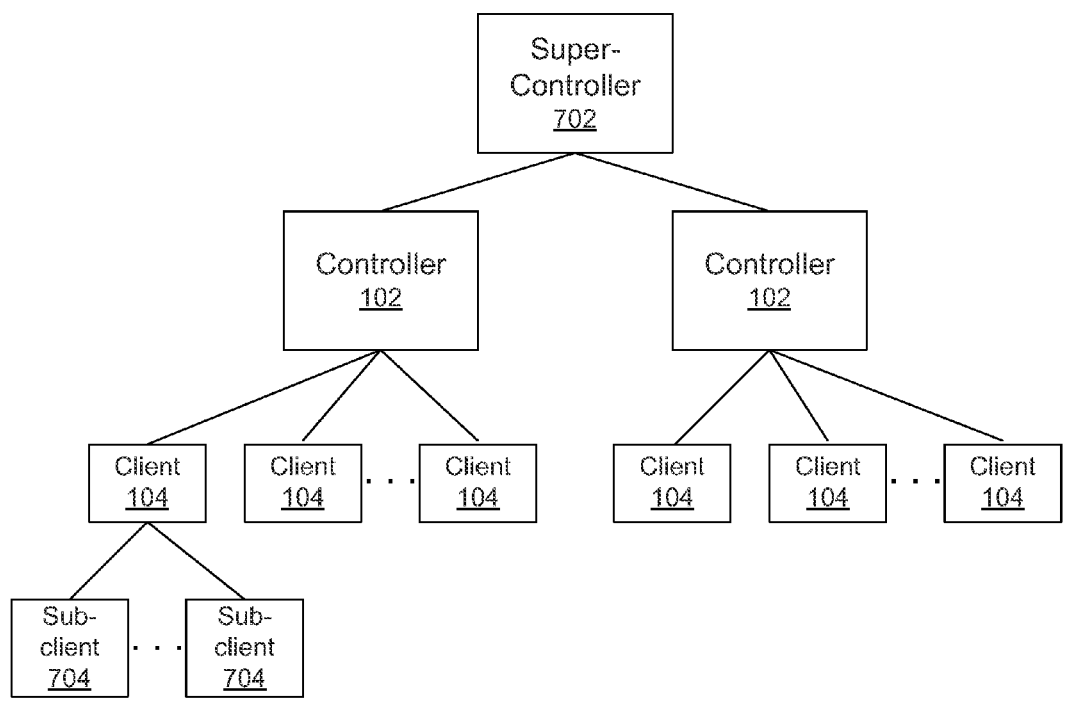
FIG. 7 is a diagram showing one example of a vertically-scaled environment for utilizing reverse transaction communications, the environment including controllers, clients and a super-controller.

The example communications between a controller 102 and client 104 described above may be scaled in any suitable manner. For example, the interactions described above may be scaled horizontally, as the controller 102 may simultaneously manage multiple clients 104 in the manner described above, for example, as illustrated in FIG. 1. Also, in some embodiments, the interactions described above may be scaled vertically. FIG. 7 is a diagram showing one example of a vertically-scaled environment for reverse transaction communications including controllers 102, clients 104 and a second layer or super-controller 702. The various components 702, 102, 104 may communication with one another via a network such as the network 106 (not shown in FIG. 7). The super controller 702 may utilize reverse transaction communications to provide commands to the various controllers 102, for example, in the same way that controllers 102 provide commands to clients 104 as described above. Commands provided to the various controller 102 may be utilized by the controllers 102 to select commands for various clients 104 in communication with the controllers 102. Also, it will be appreciated that some clients 104 may be in communication with sub-clients 704. For example, a client 104 in communication with sub-clients 704 may be programmed to operate relative to the sub-clients 704 in a manner similar to which the controller 102 operates relative to its various clients 104. For example, clients 104 in communication with sub-clients 704 may break commands received from the controller 102 into discrete tasks. Some or all of the tasks may be "assigned" to one or more sub-clients 704 (e.g., utilizing response messages provided to the sub-clients 704 in response to request messages received from each sub-client 704).

It will be appreciated that reverse transaction communications, as described herein, may provide various security-related advantages. For example, clients 104 may operate under the direction of a controller 102 with knowledge only of the controller's universal resource locator (URL) or other network address. This may minimize the amount of sensitive information stored at each client 104 that might fall into the hands of a malicious user (e.g., for attacking the distributed system). Also, as described herein, credentials of the originating party may be included in both the messages from the controller 102 to the client 104 and the messages from the client 104 to the controller 102. Accordingly, the respective components 102, 104 may block access to their counter-party when the country-party's credentials are either missing or corrupted. Additional identity verification between hosts 102 and clients 104 may be performed in various example embodiments. Also, in some example embodiments, the underlying transport layer protocol may be selected to enhance security. For example, HTTPS, or another encryption-supporting protocol may be utilized. In some example embodiments, secure and non-secure transport layer protocols may be utilized together. For example, the client 104 may be configured to switch the controller URL from an HTTP URL to an HTTPS URL when a message is sensitive. For example, some request messages 210 including command responses may be sensitive, such that a secure protocol is desirable.

In various example embodiments, the controller 102 and/or the clients 104 may be configured for operation in the absence of communication with their counter-party or counter-parties. For example, when a connection between the controller 102 and a client 104 is closed, the controller 102 may be notified according to the underlying transport layer protocol. If the underlying transport layer protocol does not support a disconnect notification, the controller 102 may timeout a callback of a command and save the command until another suitable worker is available. In some example embodiments, the controller 102 may be configured to timestamp responses including commands, such as 206. If a client 204 is tardy in replying to a command, the controller 102 may identify a stale reply by comparing the CID of a request including a result, such as 210, to an associated time stamp. When a controller 102 connection is disconnected, a client 104 may be notified from the transport layer protocol implementation, and may re-send a failed request message 202, 210 at a later time. If the underlying transport layer protocol does not support a connection-dropped notification, the client 104 may exceed its time out period for receiving a response, such as 206. When this occurs, the client may wait until the controller 102 is available again.

In some example embodiments, it may be desirable for some or all of the clients 104 to execute commands in a synchronized manner. For example, some device testing tasks require all or a portion of the clients 104 to start a command, complete a command, and/or perform an intermediate command step at the same time. Accordingly, the controller 102 may be configured to synchronize the clocks of the various clients 104 with which the controller 102 is communicating. For example, some or all of the responses messages 206 from the server may include clock synchronization data that may be utilized by the respective clients 104 to update their own clocks to match that of the controller 102.

Figure 8:
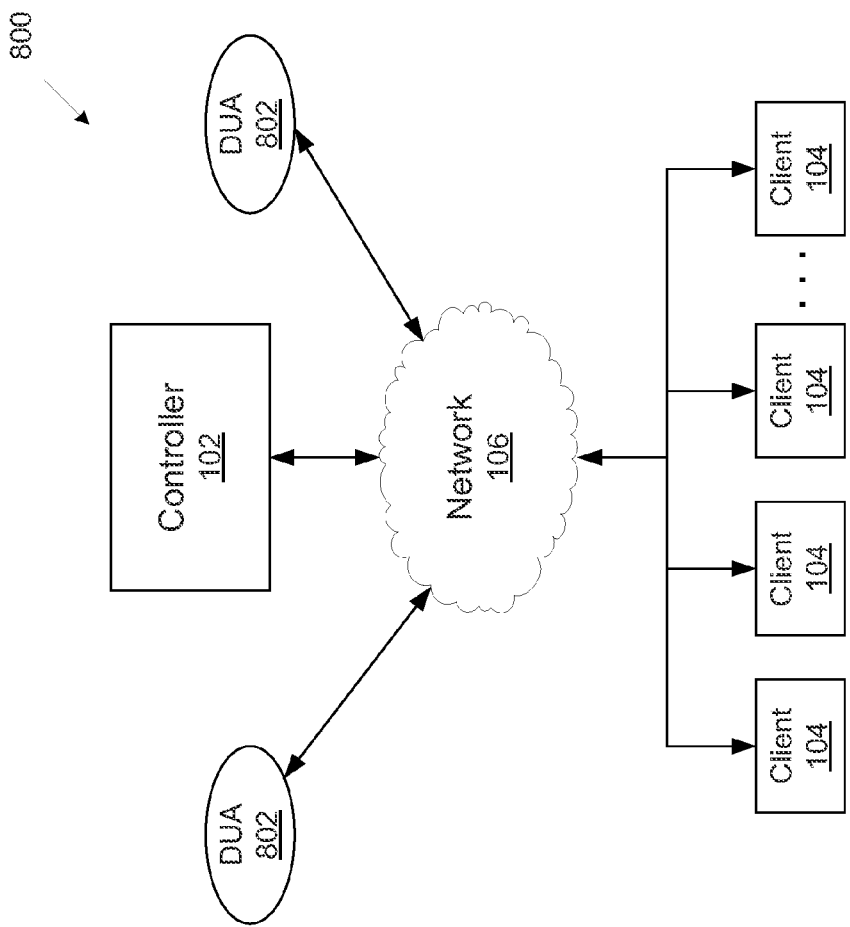
FIG. 8 is a diagram showing one embodiment of an environment for utilizing reverse transaction communications in the context of device testing.

FIG. 8 is a diagram showing one embodiment of an environment 800 for utilizing reverse transaction communications in the context of device testing. The environment 800 comprises the controller, clients 104 and network 106 similar to that of the environment 100 described herein above. The environment 800 also comprises devices under analysis (DUA) 802 that may be subjected to various tests by the clients 104 (e.g., in response to commands provided by the controller 102 as described above). The DUA's 802 may represent software and/or hardware. Such software may include, for example, applications, operating systems, and/or communications systems. Such hardware may include, for example, one or more computer devices. A computer device may be, for example, a switch, a bridge, a router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, network protocol analyzer, etc. A DUA 802 may also be multiple devices that are communicatively coupled to form a system or network of devices. For example, a DUA 802 may be two firewall devices that establish an encrypted tunnel between themselves. Different DUA's 802 may communicate with one another via the network 106 although it will be appreciated that, in various example embodiments, the network 106 may form all or a part of a DUA 802.

To test the DUA's 802, the controller 102 may be configured to provide commands to the various clients 114, as described herein above, wherein each command instructs the respective client to perform all or part of a testing task. Example testing tasks to be performed on DUA's 802 may include, for example, monitoring tasks (e.g., Secure Shell (SSH) channel monitoring, Simple Network Management Protocol (SNMP) monitoring, protocol instrumentation, etc.), or interactive tasks (e.g., concurrency scale tests, network performance tests, fuzz tests, etc.). Some testing tasks may be performed individually by a single client 104, while other testing tasks may be performed collectively by multiple clients 104 working in conjunction with one another.

Figure 9:
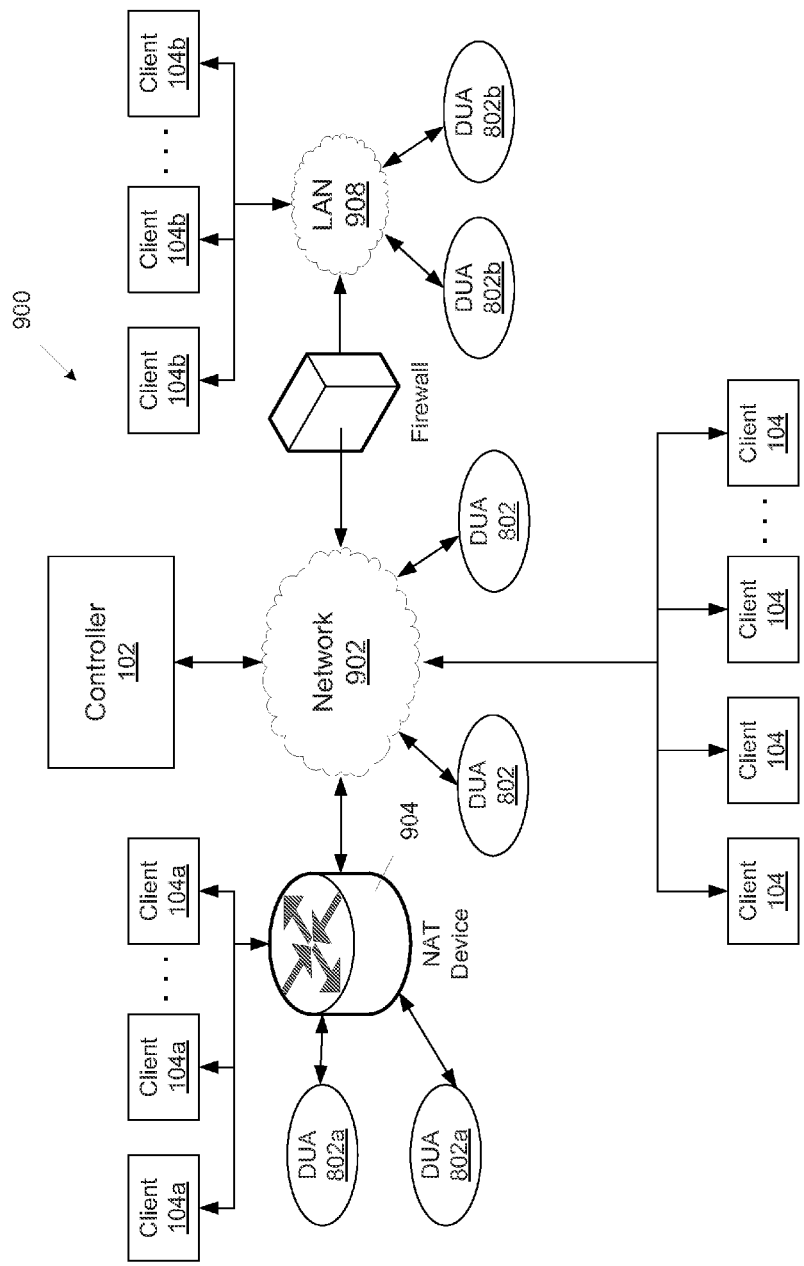
FIG. 9 is a diagram showing one embodiment of an environment for utilizing reverse transaction communications.

FIG. 9 is a diagram showing one embodiment of an environment 900 for utilizing reverse transaction communications. The environment 900 is provided to demonstrate network configurations in which reverse transaction communications may be advantageous. For example, the controller 102 shown in FIG. 9 is in communication with various clients 104 via a network 902. The network 902, for example, may be and or comprise a wide area network (WAN) such as the Internet. The controller 102 may utilize the network 902 to provide commands to the clients 104, for example, in the manner described herein. Various DUA's 802 are also shown communicating directly on the network 902. For example, when the controller 102 and clients 104 are utilized in conjunction with a distributed testing system, the clients 104 may be configured to perform various testing tasks on the DUA's 802 in response to commands from the controller 102.

The environment 900 also includes an optional set of clients 104a that communicate with the controller 102 via the network 902 and a network address translation (NAT) device 904. As described above, reverse transaction communications may allow the controller 102 to communicate with the clients 104a without requiring the controller 102 to connect to any devices inside of the NAT device 904. For example, a request message 202, 210 from a client 104a may have its address information modified as the request message 202, 210 is routed through the NAT device 904. Because the requests 202, 210 originate from the clients 104a, and because the NAT modification takes place at the transport layer, the NAT device 904 may be transparent to the controller. Optional DUA's 802*a* are also illustrated as separated from the network 902 by the NAT device 904. In various example embodiments, the clients 104*a* may receive commands to perform testing tasks on the DUA's 802*a*.

The environment 900 may also include an optional set of clients 104*b* that communicate with the controller 102 via the network 902 and a LAN or other network 908 that is behind a firewall 906. Again, reverse transaction communications may allow the controller 102 to communicate with the clients 104*b* without requiring the controller to connect to any devices inside of the firewall 906. For example, because communications between the clients 104*b* and the controller 102 (e.g., the requests 202, 210) may be initiated by the clients 104*b*, the controller 102 may simply reply to access the clients 104*b*. Optional DUA's 802*b* are also illustrated as communicating on the LAN 908 behind the firewall 906. In various example embodiments, the clients 104*b* may receive commands to perform testing tasks on the DUA's 802*b*.

Different computer systems components described herein (e.g., the controller 102, the clients 104, 104', 104*a*, 104*b*, the DUA's 802, 802*a*, 802*b*, the super controllers 702, etc., may be executed by computer devices in communication with one another according to any suitable method. For example, in some example embodiments, some or all of the computer systems described herein may be in communication with one another via a network or networks, such as the networks 106, 902, 908 described herein. The network or networks may operate according to any suitable wired or wireless communication protocol and may utilize any suitable hardware or software. In some example embodiments, the network or networks may include, a wide area network (WAN) such as the Internet, a local area network (LAN), etc.

According to various example embodiments, the testing tasks performed by the clients 104 may be of any suitable type. For example, one or more clients 104 may be configured, as described herein, to perform monitoring tasks and interactive tasks. In monitoring testing tasks, the clients 104 may observe the DUA's 802 and record properties describing the DUA's 802. In various example embodiments, each DUA 802 may be observed by a separate client 104 and/or by multiple clients 104. In interactive tasks, the clients 104 may interact with the DUA's 802 to observe the response and/or find a limit of the capabilities of the DUA's 802.

Examples of monitoring testing tasks may include Secure Shell (SSH) channeling monitoring, Simple Network Management Protocol monitoring, and Protocol Instrumentation. According to SSH channel monitoring, one or more clients 104 may connect to a DUA 802 and execute a periodic command for the purpose of establishing system health. The command may, for example, check a status of a process, a level of central processor unit (CPU) utilization, a level of memory utilization, etc. The connection between the one or more clients 104 and the DUA 802 may be made according to an SSH channel. According to SNMP monitoring, one or more clients 104 may collect statistics from a Management Information Base of a DUA 802. Example statistics may include, for example, CPU and memory utilization, error counts, etc. According to Protocol Instrumentation, one or more clients 104 may collect statistics and/or flag errors encountered during periodic checkpoint exchanges with the DUA 802 using valid protocol transactions. Although each of the monitoring testing tasks is described herein with reference to a single DUA 802, it will be appreciated that these testing tasks may be ramped up using multiple clients 104 (e.g., a group of clients 104). For example, a group of clients 104 may be assigned a testing task requiring the group to monitor a corresponding group of DUA's 802.

Interactive testing tasks may generally comprise testing tasks where the client 104 or engine 108 provide simulated interactions (e.g., communications and/or connections) with the DUA's 802 to test the capacity and/or security of the DUA's 802. Utilizing groups of clients 104 to perform load testing may increase the volume and/or the variety of types of communications and/or connections that may be sent to and/or initiated with the DUA's 802. Examples of interactive testing tasks include concurrency scale tests, network performance tests, fuzz tests as well as other load and/or security-related tests. According to concurrency scale tests, a client 104 or clients 104 may generate high levels of connections to a DUA 802 utilizing various transport protocols including, for example Transmission Control Protocol (TCP), User Datagram Protocol (UDP) and Secure Sockets Layer (SSL). The clients 104 may collect statistics for the attempted connections including, for example, pass rates, timeouts, errors, latencies, etc. According to network performance testing tasks, the client 104 or engines may generate high levels of network traffic representing varied types of transactions. Statistics may be kept for bytes and packets sent and received on each interface. Examples for generating and executing scale and/or concurrency testing based on scenarios are provided in commonly-assigned U.S. patent application Ser. No. 13/101,728 (the '728 application) titled, "Generating Communication Protocol Test Cases Based On Network Traffic," filed on May 5, 2011 and U.S. patent application Ser. No. 13/118,155, (the '155 application) titled, "Scenario Based Scale Testing," filed on May 27, 2011, both of which are incorporated by reference herein in their entireties.

According to a fuzz test or mutation test, a client or clients 104 may generate invalid, unexpected and/or random data within the structure of one or more network protocols. The invalid, unexpected and/or random data is then provided to DUA's 802. The test engine or engines 108 may identify the types of invalid, unexpected or random data cause different DUA's 802 to fail, thus identifying vulnerabilities of the DUA's 802. Invalid, unexpected and/or random data may be generated in any suitable manner. Different types of fuzz testing tasks may include structure attacks, semantics attacks and state attacks. According to a structure attack, the clients 104 generate messages that contain values and/or parameters that violate an intended protocol. Types of structure attacks include, for example, empty-field, empty-message, extra-data, incomplete, invalid-count, invalid-enum (enumeration), invalid-eol (end-of-line), invalid-field, invalid-index, invalid-length, invalid-offset, invalid-syntax, invalid-type, invalid-utf8 (Unicode Transformation Format), missing-data, missing-field, mixed-case, overflow, repeated-field, too-many-fields, truncated, underflow, wrong-encoding, fmt-string (format), fragmented-field, invalid-encoding, invalid-field, invalid-ip (IP address), invalid-path, invalid-string, recursion, self-reference, and null-char (character), etc.

According to a semantics attack, the clients 104 may send the DUA's 802 messages that are technically correct, but nonetheless unexpected. For example, one type of semantics attack may involve a message that indicates an invalid (e.g., non-existent) resource, such as a printer. This can cause the DUA 802 to hang or crash unexpectedly. Another example of a semantics attack may be a network packet with a source Internet Protocol (IP) address of "all-broadcast." If the DUA 802 were to respond to such a packet, it would generate enough packets to flood the network. According to a state attack, the clients 104 may generate messages that are semantically correct, but incorrect based on the expectations of the device. For example, one type of state attack may involve the clients 104 sending messages that are out-of-order (e.g., with respect to the type of message the DUA 802 is expecting to receive). Examples for generating test cases for fuzz and/or mutation attacks are described in commonly owned U.S. patent application Ser. No. 11/351,309, titled "Portable Program for Generating Attacks on Communication Protocols," filed Feb. 10, 2006, and U.S. patent application Ser. No. 11/351,403, titled "Platform for analyzing the security of communication protocols and channels", also filed Feb. 10, 2006, the disclosures of which are incorporated herein by reference in their entireties.

In some example embodiments, testing tasks executed by clients 104 as described herein may be utilized to test the implementation of a communication protocol using one or more test cases. A test case generally includes one or more message exchanges between two or more entities (e.g., two devices or two processes). A test case (e.g., the messages that are exchanged) can be generated manually or automatically, as described in commonly-assigned U.S. patent application Ser. No. 11/514,809, filed Sep. 1, 2006, titled "Automated Generation of Attacks for Analyzing the Security of Communication Protocols and Channels" (the '809 Application), which is incorporated by reference herein in its entirety.

A protocol is generally defined by a specification. The specification can be expressed in a variety of formats, such as an Internet Engineering Task Force (IETF) Request for Comments (RFC), Web Services Description Language (WSDL), Backus-Naur Form (BNF), Augmented BNF (ABNF), regular expressions, Interface Definition Language (IDL), Document Type Definition (DTD), Management Information Base (MIB), eXtended Markup Language (XML) schema, eXternal Data Representation (XDR), and Abstract Syntax Notation 1 (ASN.1). The '809 Application describes software programs that parse machine-readable protocol specifications and generate test cases based on the specifications.

Other types of interactive testing tasks may involve general tests of the overall security of the device or DUA's 802. Examples of such tasks may include, for example, negotiating a lower (e.g., less secure) encryption algorithm, dictionary attacks (brute forcing commonly-used passwords), resource exhaustion, identifying misconfiguration of the DUA 802, identifying mechanisms for sending messages through the DUA 802 that bypass various security checks, and detecting insecure implementations of standard protocols and information disclosure.

Various communications are described herein between computer hardware and/or software components such as, for example, the controller 102, the clients 104, 104', 104a, 104b, the DUA's 802, 802a, 802b, etc. When communications between computer components takes place over the Internet or other public network, it will be appreciated that these communications may be encrypted. For example, one or more of the systems may utilize an asymmetric or public key infrastructure (PKI) method. According to a PKI system, each system may have a public key that may be used for encrypting messages and a private key that may be used for decryption. The public key may be provided to any systems having need to send data to the first system. The data may be encrypted with the public key such that it may only be decrypted with the private key, which may be kept secret by the receiving system. In this manner, all communications between the various systems may be decrypted only by their intended recipients.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention. Also, while specific testing applications have been described herein, it will be appreciated that the applications provided according to the description herein may include other testing applications as well as non-testing applications.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

Moreover, the processes associated with the present example embodiments may be executed by programmable equipment, such as computers. Software or other sets of instructions may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, any non-transitory media such as, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. It will be appreciated that the term non-transitory refers to the medium and not to any data stored thereon. For example, a random access memory (RAM) is non-transitory, although the data stored thereon may change regularly.

A "computer," "computer device," "machine," "computer device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed example embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various example embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various example embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various example embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various example embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is, in turn, connected to a switch. The term "switch" can also include routers and bridges, as well as other devices that distribute data traffic by application content (e.g., a Web URL identifier). Switches may operate at one or more OSI model layers, including physical, data link, network, or transport (e.g., end-to-end). A device that operates simultaneously at more than one of these layers can be considered a multilayer switch. In certain example embodiments, routers or other like networking devices may be used to forward data packets between networks using headers and forwarding tables to determine an optimum path through which to transmit the packets.

As employed herein, an application server may be a server that hosts an API, such as the API 110, to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While various example embodiments of the invention have been described herein, it should be apparent, however, that various modifications, alterations and adaptations to those embodiments may occur to persons skilled in the art with the attainment of some or all of the advantages of the present invention. The disclosed example embodiments are therefore intended to include all such modifications, alterations and adaptations without departing from the scope and spirit of the present invention as set forth in the appended claims.

I claim:

1. A system for managing a plurality of clients, the system comprising:
   a computer system comprising at least one processor and associated memory, wherein the computer system is programmed to execute a controller, and wherein the controller is programmed to:
   receive a first request message from a first client among the plurality of clients that announces availability of the first client to be managed by the controller, wherein the first request message is formatted as a request, and wherein the first request message comprises information that identifies one or more distributed test capabilities of an application running on the first client, wherein the distributed test capabilities are selected from a group of capabilities used when testing a system under test selected from a group including load testing, mutation testing or fuzz testing;
   select a distributed test command to be executed by the first client based at least in part on the information that identifies the capabilities of the application running on the first client;
   send a response message to the first client, wherein the response message is formatted as a response directed to the application running on the first client, and wherein the response message comprises information describing the distributed test command to be executed at the first client;
   receive a second request message from the first client, wherein the second request message comprises information describing a result of the distributed test command selected to be executed at the first client.

2. The system of claim 1, wherein the controller is further programmed to:
   send a second response message to the first client, wherein the second response message is formatted as a response directed to the application running on the client, and wherein the response message comprises information that identifies a second command to be executed at the first client; and
   receive a third request message from the first client, wherein the third request message comprises information describing a result of execution of the second command at the first client.

3. The system of claim 1, wherein the first request message and the response message constitute a request/response pair.

4. The system of claim 1, wherein the response message comprises a command identification uniquely identifying the command, wherein the second request comprises the command identification uniquely identifying the command, and wherein the controller is further programmed to associate the second request message to the response message based at least in part on the command identification.

5. The system of claim 1, wherein the first request message further comprises a unique identifier of the first client.

6. The system of claim 1, wherein the first request message further comprises credential information for verifying an identity of the client.

7. The system of claim 6, wherein the credential information comprises an application program interface (API) key for providing the controller with access to an API of the first client.

8. The system of claim 6, wherein the response message comprises the API key.

9. The system of claim 1, wherein first request message further comprises at least one capability of the first client, and wherein controller is further programmed to select the command to be executed based on the at least one capability of the first client.

10. The system of claim 1, wherein the controller is further programmed to send an initial message to the first client before sending the response message, wherein the initial response message comprises a command instructing the first client to continue waiting for a response to the first request.

11. The system of claim 1, wherein the controller is further programmed to:
    send a second level request message to a second level controller, wherein the second level request message is formatted as a request, and wherein the second level request message comprises information describing the controller; and
    receive from the second level controller a second level response message, wherein the second level response message is formatted as a response, wherein the second level response message comprises information describing a task to be performed by the controller, and wherein the selection of the command to be executed by the first client is also based at least in part on the task to be performed by the controller.

12. The system of claim 1, wherein the response message is sent to the first client via at least one component selected from the group consisting of a network address translation (NAT) device and a firewall.

13. The system of claim 1, wherein the command instructs the first client to perform a testing task on a device under analysis (DUA).

14. The system of claim 13, wherein the testing task is selected from the group consisting of: Secure Shell Channel (SSH) monitoring; Simple Network Management Protocol (SNMP) monitoring and protocol instrumentation.

15. The system of claim 13, wherein the testing task is selected from the group consisting of: executing a portion of a concurrency test against the DUA; and launching a mutation test against the DUA.

16. A computer-implemented method for managing a plurality of clients, the method comprising:
    receiving, by a computer system, a first request message from a first client among the plurality of clients that announces availability of the first client to be managed by the controller, wherein the first request message is formatted as a request, wherein the first request message comprises information that identifies one or more distributed test capabilities of an application running on the first client, wherein the distributed test capabilities are selected from a group of capabilities used when testing a system under test selected from a group including load testing, mutation testing or fuzz testing, and wherein the computer system comprises at least one processor and associated memory;
    selecting, by the computer system, a distributed test command to be executed by the first client based at least in part on the information that identifies capabilities of the application running on the first client;

sending, by the computer system, a response message to the first client, wherein the response message is formatted as a response directed to the application running on the first client, and wherein the response message comprises information describing the distributed test command to be executed by the first client;

receiving, by the computer system, a second request message from the first client, wherein the second request message comprises information describing a result of execution of the distributed test command selected to be executed at the first client.

17. The method of claim 16, wherein the first request message further comprises a unique identifier of the first client.

18. The method of claim 16, wherein first request message further comprises at least one capability of the first client, and wherein the method further comprises selecting the command to be executed based on the at least one capability of the first client.

19. The method of claim 16, wherein the command instructs the first client to perform a testing task on a device under analysis (DUA).

20. The method of claim 19, wherein the testing task is selected from the group consisting of: Secure Shell Channel (SSH) monitoring; Simple Network Management Protocol (SNMP) monitoring and protocol instrumentation.

21. The method of claim 19, wherein the testing task is selected from the group consisting of: executing a portion of a concurrency test against the DUA; and launching a mutation test against the DUA.

22. A client system for receiving and executing processing commands received from a controller, the system comprising:

a computer system comprising at least one processor and associated memory, wherein the computer system is programmed to execute an application running on the client, and wherein the application running on the client is programmed to:

send a first request message to the controller that announces availability of the client to be managed by the controller, wherein the first request message is formatted as a request, and wherein the first request message comprises information that identifies distributed test capabilities of the application running on the client;

receive a response message from the controller, wherein the response message is formatted as a response, and wherein the response message comprises information describing a distributed test command to be executed at the client;

execute the distributed test command; and send a second request message to the controller, wherein the second request message is formatted as a request, and wherein the second request message comprises information describing a result of execution of the distributed test command indicated by the response message.

23. The system of claim 22, further comprising:

receiving a sub-client request message from a sub-client, wherein the second level request message is formatted as a request, and wherein the sub-client request message comprises information describing the sub-client; and sending a sub-client response message to the sub-client, wherein the sub-client response message is formatted as a response, and wherein the sub-client response message comprises information describing a sub-command to be executed by the sub-client; and receiving a second sub-client request message from the sub-client, wherein the second sub-client request message is formatted according to the transport layer protocol as a request, and wherein the second sub-client request message comprises information describing a result of the sub-command indicated by the sub-client response message, and wherein the information describing the result of the command indicated by the response message comprises the information describing the result of the sub-command.

24. The system of claim 22, wherein the command instructs the client to perform a testing task on a device under analysis (DUA).

25. The system of claim 24, wherein the testing task is selected from the group consisting of: Secure Shell Channel (SSH) monitoring; Simple Network Management Protocol (SNMP) monitoring and protocol instrumentation.

26. The system of claim 24, wherein the testing task is selected from the group consisting of: executing a portion of a concurrency test against the DUA; and launching a mutation test against the DUA.

27. A computer-implemented method for receiving and executing processing commands received from a controller, the method comprising:

sending, by a client computer system, a first request message to the controller that announces availability of the client to be managed by the controller, wherein the first request message is formatted as a request, wherein the first request message comprises information that identifies distributed test capabilities of an application running on the client, wherein the distributed test capabilities are selected from a group of capabilities used when testing a system under test selected from a group including load testing, mutation testing or fuzz testing, and wherein the client computer system comprises at least one processor and associated memory;

receiving, by the client computer system, a response message from the controller, wherein the response message is formatted as a response, and wherein the response message comprises information describing a distributed test command to be executed by the client;

executing the distributed test command, by the client computer system; and sending, by the client computer system, a second request message to the controller, wherein the second request message is formatted as a request, and wherein the second request message comprises information describing a result of execution of the distributed test command indicated by the response message.

28. The system of claim 3, wherein the request/response pair are implemented using an application layer protocol selected from the group consisting of: hypertext transfer protocol (HTTP), hypertext transfer protocol secure (HTTPS), Session Initiation Protocol (SIP), file transfer protocol (FTP), and media gateway control protocol (MGCP).

29. The method of claim 16, wherein the first request and the response pair of messages are implemented using an application layer protocol selected from the group consisting of: hypertext transfer protocol (HTTP), hypertext transfer protocol secure (HTTPS), Session Initiation Protocol (SIP), file transfer protocol (FTP), and media gateway control protocol (MGCP).

* * * * *